3,519,511
LOW-VISCOSITY POLYOLEFINS HAVING
EXTENDED TACK
Harry W. Coover, Jr., Kingsport, Tenn., assignor to Eastman Kodak Company, Rochester, N.Y., a corporation of New Jersey
No Drawing. Filed Oct. 13, 1965, Ser. No. 495,704
Int. Cl. G03g 5/00
U.S. Cl. 156—234
3 Claims

ABSTRACT OF THE DISCLOSURE

An article of manufacture comprising a substrate having coated thereon a crystallizable, polymeric, thermoplastic hydrocarbon material having an I.V. of from about 0.05 to about 0.7, a melt viscosity of from about 500 to about 100,000 cp. at 150° C., and a tack time of at least about 5 seconds. In another aspect, the invention comprising using said thermoplastic hydrocarbon material for adhering structures together and particularly in document copying applications.

---

This invention relates to processes and articles of manufacture which employ certain crystallizable polyolefin compositions as an adhering component.

Heretofore, the utility of crystallizable polyolefin compositions in processes which require a firm but tacky resin has been seriously limited due to the fact that when crystallizable polyolefins such as polyethylene, polypropylene and poly-1-butene solidify from their melts, crystallization rapidly occurs and the tack time is too short to be of much use. The amorphous, tacky fractions of such polymers on the other hand do not give a bond having satisfactory tensile strength.

Objects of the present invention therefore, are: to provide crystallizable polyolefin compositions having useful tack times; to provide adhesive processes which utilize crystallizable polyolefin compositions; and to provide articles of manufacture employing such compositions.

These and other objects have been achieved in accordance with the present invention through the discovery that certain low-viscosity polyolefins have the property of remaining tacky for sufficient periods of time to allow their use in adhesive applications. These polyolefins which may be processed by typical melt-coating operations, meet the following specifications: tack time—5 sec. to 60 min.; melt viscosity at 150° C.—500–100,000 cp.; I.V. in Tetralin at 145° C. of 0.05–0.7; and must contain a crystallizable component.

Low viscosity polymers which have been found to have the above properties include poly-1-butene, propylene/1-butene copolymers, ethylene/1-butene copolymers, ethylene/1-pentene copolymers, propylene/1-pentene copolymers and the like. It has been found that a broad range of coordination catalysts can be used to prepare the polyolefin compositions having the desired tack properties. The preferred compositions are made using certain highly stereospecific coordination catalysts since they must contain crystallizable components. The polyolefin may be prepared directly to the desired molecular weight using molecular weight control agents such as hydrogen, or high-molecular-weight polymers may be thermally degraded to the desired molecular weight. In order to provide even longer tack times for certain applications, it has been found convenient to blend with the polymers such materials as thermoplastic polyterpene hydrocarbon resins of molecular weights of from about 350 to about 1000 sold under the names Nirez and Piccolyte, hydrocarbon resins of a molecular weight of from about 500–1,500 obtained from petroleum cracking bottoms and sold under the name Piccopale, and polymerized wood rosin sold under the same Stabelite. In this manner the tack time may be extended several times. Such blends are quite compatible, do not separate upon cooling from the melt, and are usually quite transparent.

In both the straight adhesion and the document copying applications an extended tack time is essential. For the hot-melt adhesive applications the long tack time is necessary in order to supply satisfactory "open time." For the copying process the extended tack time is necessary in order to permit the preparation of several copies before the matrix becomes non-tacky. In the matrix used in the document copying processes, it is usually necessary to include additives such as pigments, oil soluble dyes, glass beads, fillers or the like. The low-viscosity polyolefins are highly compatible with such pigments or dyes used to give the matrix a black or other finish. Since, the present polymers also melt and become amorphous in character at convenient temperatures, the adhesive or the matrix may be readily activated by infrared light or other suitable heating means.

The adhesive concept of the present invention may be expressed as follows: The process for adhering structures together comprising providing a structure with a coating of tacky polymeric material containing at least substantial amounts of crystallizable poly(α-olefinic) material having an I.V. of from about 0.05 to about 0.7, a melt viscosity of from about 500 to about 100,000 cp. at 150° C., and a tack time of at least about 5 seconds, and thereafter while said material is tacky, contacting said material with another structure with or without a coating of said material thereon until said material becomes non-tacky.

The document copying aspect of the present invention may be summed up as follows: The process comprising pressing a substantially solidified, tacky, crystallizable poly(α-olefinic) material having an I.V. of from about 0.05 to about 0.7, a melt viscosity of from about 500 to about 100,000 cp. at 150° C., and a tack time of at least about 5 sec. against a copy sheet, and thereafter while the material is still tacky separating said copy sheet from a portion of said material.

The principal articles which are employed in such a document copying process or which are formed thereby are as follows:

An article of manufacture comprising a substrate having coated thereon a crystallizable, polymeric, thermoplastic hydrocarbon material having an I.V. of from about 0.05 to about 0.7, a melt viscosity of from about 500 to about 100,000 cp. at 150° C., and a tack time of at least about 5 sec.

An article of manufacture comprising a substrate coated with a crystalline, polymeric, thermoplastic hydrocarbon material having an I.V. of from about 0.05 to about 0.7, a melt viscosity of from about 500 to about 100,000 cp. at 150° C., and tack time when cooled from its melt of at least about 5 sec.

It is noted that in each of the above and other aspects of the present invention, the necessary pigments, dyes, fillers and the like may be incorporated into the polymeric material.

The following examples will serve to illustrate but not limit the invention.

EXAMPLE 1

Preparation of 25/75 propylene/1-butene copolymer

In a nitrogen filled dry box, 100 ml. of dry heptane and 1.0 g. of catalyst were placed in a dry 300 ml. stainless steel autoclave. The catalyst contained ethylaluminum dichloride, hexamethylphosphoric triamide and titanium trichloride in a molar ratio of 1/0.6/1. After sealing the autoclave under slight positive nitrogen pressure, 80 ml. of liquid 1-butene and 20 ml. of liquid propylene were added to the autoclave. The autoclave was heated to 85° C. with rocking and maintained at 85° C. for 2 hr. Isobutyl alcohol was added to deactivate the catalyst and the resultant slurry was heated on the steam bath to remove catalyst residues. The copolymer was ground in cold isobutyl alcohol in a Waring Blendor and filtered. The white granular product was washed with methanol and dried. The yield of copolymer was 92 g. and its I.V. in Tetralin at 145° C. was 2.3. Infrared analysis indicated the copolymer contained 75% 1-butene. The reaction was repeated except that 100 p.s.i. of $H_2$ was used to control the molecular weight of the copolymer. This copolymer had an I.V. of 0.3. X-ray diffraction patterns indicated the presence of both polypropylene and poly-1-butene crystallinity. Other copolymers of this invention were prepared in a manner similar to that described above and included propylene/1-pentene and 1-butene/1-pentene copolymers. The copolymer composition was controlled by varying the monomer feed ratio.

EXAMPLE 2

Preparation of ethylene/1-butene copolymers

In a nitrogen filled dry box, 1.0 g. of catalyst consisting of ethylaluminum dichloride, hexamethylphosphoric triamide and titanium trichloride in a molar ratio of 1/0.6/1 was added to a 300 ml. stainless steel rocking autoclave containing 20 ml. of dry benzene. After sealing the autoclave under nitrogen, 100 ml. of liquid 1-butene was charged onto the catalyst, followed immediately by the addition of 100 p.s.i. ethylene. The mixture was heated to 70° C. with rocking and held at this temperature and pressure for 2 hr. The polymer was washed with hot isobutyl alcohol to remove catalyst residues. The rubbery, tacky white polymer weighed 25.5 g. after drying. The following table summarizes the runs using various ethylene pressures:

| Run No. | Ethylene Pressure, p.s.i. | Yield, g. | Inherent Viscosity (50 mg.) |
|---|---|---|---|
| 1 | 100 | 25.5 | Gel |
| 2 | 60 | 24.5 | [1] 2.54 |
| 3 | 20 | 24.0 | 2.64 |

[1] Partial gel.

D.T.A. melting points and infrared bands characteristic of both polyethylene and poly-1-butene were observed in these copolymers. Copolymers produced in Runs 1, 2 and 3 contained about 80, 50 and 20% ethylene, respectively. Similarly good results were obtained using a catalyst consisting of a 2/1/3 molar ratio of

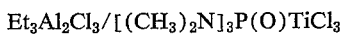

$$Et_3Al_2Cl_3/[(CH_3)_2N]_3P(O)TiCl_3$$

Ethylene/1-pentene copolymers were prepared in a similar manner.

EXAMPLE 3

Thermal degradation of high-molecular-weight copolymer

Low-viscosity copolymers were prepared from high-molecular-weight copolymer by thermal degradation at 350° C. under vacuum or under an inert atmosphere such as nitrogen. The time required to reduced the molecular weight to the desired melt viscosity range of 500 to 100,000 cp. (150° C.) at the 350° C. reaction temperature ranged from about 15 minutes to about 90 minutes. The properties of some of the low-viscosity polyolefins prepared in this way are listed in the following table.

| Composition | Melt Viscosity at 150° C., cp. | Tack Time, sec. |
|---|---|---|
| 80/20 propylene/1-butene | 1,000 | 5 |
| 70/30 propylene/1-butene | 500 | 9 |
| 60/40 propylene/1-butene | 10,000 | 20 |
| 50/50 propylene/1-butene | 15,000 | 48 |
| 40/60 propylene/1-butene | 50,000 | 150 |
| 25/75 propylene/1-butene | 2,000 | 98 |
| 10/90 propylene/1-butene | 100,000 | 23 |
| 2/98 propylene/1-butene | 1,500 | 18 |
| 50/50 ethylene/1-butene | 5,000 | 39 |
| 60/40 ethylene/1-pentene | 10,000 | 32 |
| 40/60 propylene/1-pentene | 8,000 | 110 |
| 55/45 1-butene/1-pentene | 20,000 | 162 |
| 60/40 propylene/1-butene+10% Nirez | 10,000 | 40 |
| 60/40 propylene/1-butene+20% Nirez | 9,000 | 93 |
| 60/40 propylene/1-butene+30% Nirez | 7,000 | 480 |
| 25/75 propylene/1-butene+30% Piccolyte | 2,000 | 740 |
| Poly-1-butene | 3,000 | 35 |
| Poly-1-butene +30% Nirez | 2,500 | 420 |
| 50/50 ethylene/1-butene+20% Piccopale | 4,000 | 110 |
| 30/70 propylene/1-pentene+10% Staybelite | 6,000 | 190 |

Tack times were determined by applying a 2-mil hot-melt coating (190° C.) on cardboard using a doctor blade and then measuring the length of time required for the coating to become nontacky. It is noted that such a thin film or coating firms up almost immediately and with prior crystallizable materials would become nontacky almost immediately.

EXAMPLE 4

Use of 25/75 propylene/1-butene copolymer in document copying matrix

A heat-sensitive element was prepared as follows for use in a transfer process: The 25/75 propylene/1-butene copolymer, having a melt vicosity of 2,000 cp. at 150° C. was blended with red, yellow and blue pigments in a paint mill to provide copolymer containing 15% pigment. This blend was applied as a hot-melt onto a glassine support and then spread uniformly with a doctor blade to provide a coating of about 0.3 mil thickness. After cooling, the matrix was overcoated with a thin layer of poly(vinyl alcohol).

The resulting thermographic matrix was placed in contact with an original document so that the heat-senitive layer of said material was in contact with the graphic portions of the original. The 2-ply assembly was then exposed through the support side of the matrix. The exposure comprised intense infrared irradiation using a standard 1000 watt tubular General Electric infrared bulb with elliptical reflector, operated under overload conditions, for example, from about 800 to 1460 watts and at a distance of about ½ inch from the exposing surface. The exposure produced tacky areas in said material corresponding to the image areas in the original. After exposure, the original and material of this example were separated.

The heat sensitive element having tackiness in the image areas was then passed between pressure rollers exerting 30 lb./inch of roller length and having a roller diameter of 2½ inches. In the pressure transfer, the coated side of the heat-sensitive element was in contact with a copy sheet of highly absorbent wet-strength paper. The transfer produced good black image reproduction of the original on the copy paper. By repeating the transfer step, several high-quality copies of the original were produced from the single thermographic exposure. The time which elapsed for the production of these several copies was approximately one minute. Similarly good results were obtained when glass beads having an average diameter in the range from about 18 to about 40μ were included in the matrix to act as a solid particle extender. Also, good results were obtained using other low-viscosity polyolefins listed in Example 3.

EXAMPLE 5

Use of propylene-1-butene copolymer containing polyterpene resins as hot-melt adhesives A 50/50 propylene/1-butene copolymer was blended with 20% Nirez by melting them and stirring together. The melt viscosity of the mixture was 1500 cps. at 150° C. This formulation was applied in molten form to the flaps of a cardboard container and then the flaps were folded over and pressed together. An excellent seal was obtained and the adhesive bond was not harmed when these cartons were subjected to temperatures of 100° F. and relative humidity of 90% or greater. Similarly good results were obtained using ethylene/1-butene copolymer containing 10 to 30% Nirez, propylene/1-pentene copolymer containing 5 to 30% Piccolyte or butene/1-pentene copolymer containing 10 to 30% Piccopale.

EXAMPLE 6

Use of 60/40 propylene/1-butene copolymers as hot-melt adhesives

A propylene/1-butene copolymer having a melt viscosity of 1,000 cps. at 150° C. was applied in molten form to labels using a hot-melt applicator and then the labels were attached to a variety of packages including cartons, metal cans and glass containers. The labels adhered well and did not fall off after standing for long periods of time. Similarly good results were obtained with other propylene/1-butene contents ranging from 20% to 99% and for melt viscosities of 500, 2,000, 4,000, 10,000, 50,000 and 100,000 cps. at 150° C.

The invention has been described in detail with particular reference to preferred embodiments thereof, but, it will be understood that variations and modifications can be effected within the spirit and scope of the invention as described hereinabove and as defined in the appended claims.

I claim:
1. In a document copying method wherein a thermographic matrix comprised of a heat sensitive layer on a support is placed in contact with an original document so that said heat sensitive layer is in contact with the graphic portions of said original document, the resulting 2-ply assembly is exposed to infrared radiation, the exposed thermographic matrix is separated from the original document, the heat sensitive layer of the separated, exposed thermographic matrix is pressure contacted with a sheet of paper to effect image reproduction of the original document on said sheet and the resulting sheet is separated from said exposed thermographic matrix, the improvement which comprises employing as said heat sensitive layer a substantially solidified, crystallizable polymer selected from poly-1-butene and a copolymer of an alpha-olefin having from 2 to 5 carbon atoms with a dissimilar alpha-olefin having from 4 to 5 carbon atoms, said dissimilar alpha-olefin being present in an amount of about 20% to 98% by weight, said polymer having an I.V. of from about 0.05 to about 0.7, a melt viscosity of from about 500 to 100,000 cps. at 150° C., and a tack time of at least about 5 seconds.

2. The process of claim 1 wherein the polymer is a copolymer of propylene and 1-butene.

3. The process of claim 1 wherein the polymer is poly-1-butene.

References Cited

UNITED STATES PATENTS

| | | | |
|---|---|---|---|
| 3,081,699 | 3/1963 | Gulko | 156—230 |
| 3,120,611 | 2/1964 | Lind | 117—36.1 XR |
| 3,143,454 | 8/1964 | Hannon | 156—499 |
| 3,278,504 | 10/1966 | Eells et al. | 260—94.9 |

OTHER REFERENCES

Margerison et al.: An Introduction to Polymer Chemistry, Pergamon Press, New York (1967), pp. 101–103 relied on. Copy in Search Center, Reference Section.

O'Driscoll, K. F.: The Nature and Chemistry of High Polymers, Reinhold, New York (1964), pp. 61, 62 relied on.

JOHN T. GOOLKASIAN, Primary Examiner

W. E. HOAG, Assistant Examiner

U.S. Cl. X.R.

101—470; 117—36.7; 156—320; 250—65; 260—17.5, 27, 88.2, 93.7; 346—135